Patented July 14, 1925.

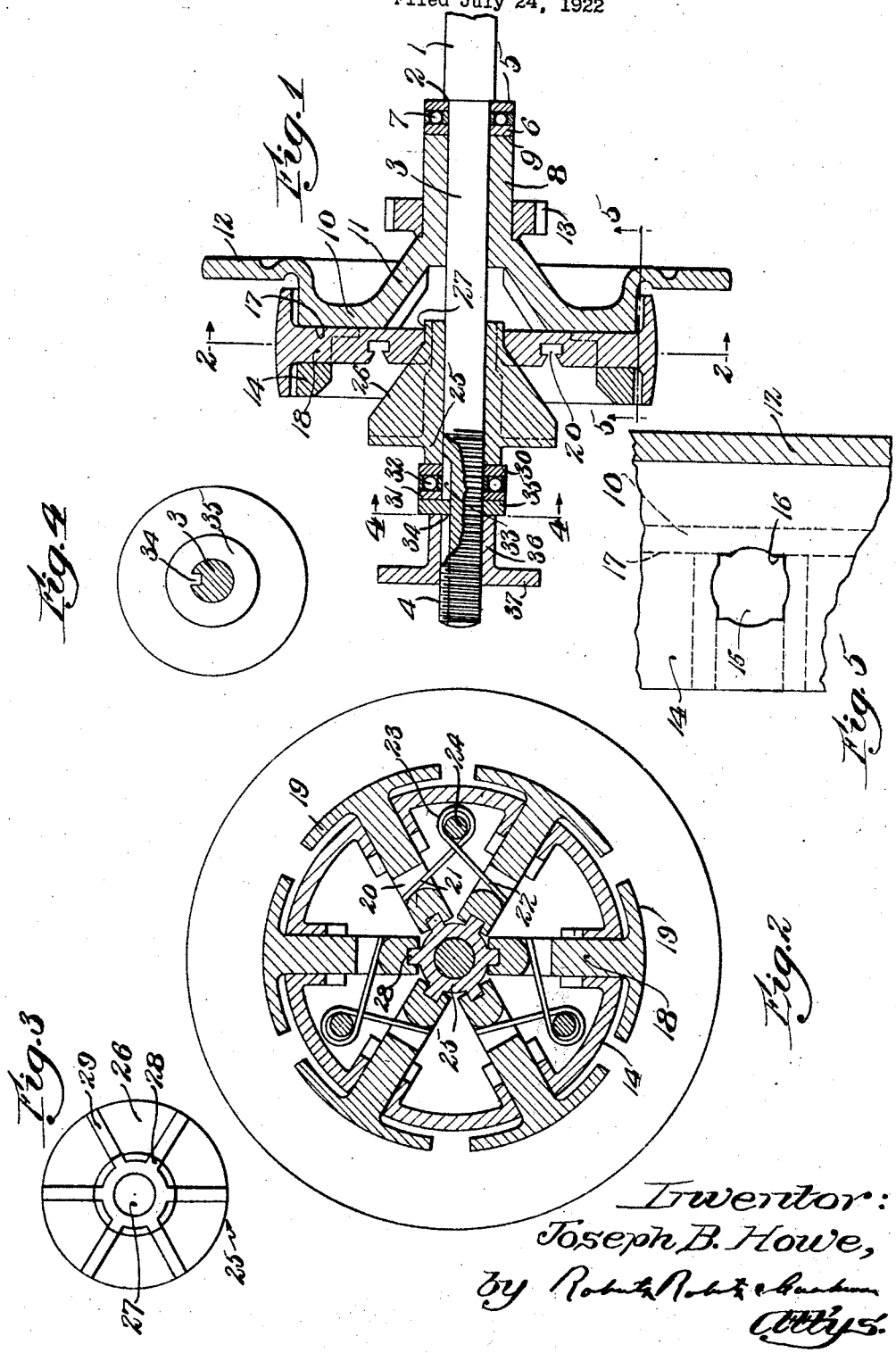

1,545,658

UNITED STATES PATENT OFFICE.

JOSEPH B. HOWE, OF WORCESTER, MASSACHUSETTS, ASSIGNOR TO GEORGE S. HARWOOD & SON, OF BOSTON, MASSACHUSETTS, A COPARTNERSHIP CONSISTING OF SYDNEY HARWOOD AND JOHN H. HARWOOD.

EXPANSION PULLEY.

Application filed July 24, 1922. Serial No. 577,007.

*To all whom it may concern:*

Be it known that I, JOSEPH B. HOWE, a citizen of the United States, and resident of Worcester, in the county of Worcester and State of Massachusetts, have invented new and useful Improvements in Expansion Pulleys, of which the following is a specification.

This invention relates to expansion pulleys and more particularly to pulleys of that kind in which provision is made for accurately and minutely varying the diameter of the pulley during operation by the manipulation of a single controlling element.

Pulleys of this type are particularly useful in the operation of certain textile machinery where it is necessary to drive the fibre delivering elements of one machne at a speed accurately related to the speed of movement of the fibre receiving elements of a succeeding machine. In such cases it is common to connect the driving means for such delivering and receiving elements by means of a belt engaging an expansible pulley, and varying the effective diameter of the latter to adjust the speed of one of such elements relatively to the other.

Objects of the present invention are to provide a pulley of the above type which is free running and substantially noiseless in operation even at high speeds; capable of retaining any given adjustment without necessitating the use of a lock nut, set screw, or equivalent device; comprising a minimum number of parts; and which is strong and substantial while relatively cheap to manufacture.

In the accompanying drawings one specific embodiment of the invention is illustrated by way of example and in such drawings;

Fig. 1 is a diametral cross section of the complete pulley device, the parts being shown in fully contracted position;

Fig. 2 is a vertical cross section on the line 2—2 of Fig. 1;

Fig. 3 is an end elevation of the expanding device forming part of the pulley;

Fig. 4 is a cross section on the line 4—4 of Fig. 1; and

Fig. 5 is an enlarged fragmentary cross section on the line 5—5 of Fig. 2, certain parts being omitted.

Referring to the drawings, the numeral 1 indicates a supporting shaft having a shoulder at 2 and a portion 3 of somewhat reduced diameter to the left of such shoulder, as viewed in Figure 1.

The outer end of the portion 3 is externally screw threaded at 4, and an anti-friction thrust bearing is mounted upon the reduced portion 3 of the shaft adjacent to the shoulder 2, such bearing comprising the collars 5, 6 and the interposed balls 7. A hub 8 is mounted to turn freely upon the reduced portion 3 of the shaft, one end 9 of such hub bearing against the collar 6. The opposite end of the hub is provided with an outstanding flange 10 which is dished at its central portion as indicated at 11, and provided with a radial guard flange 12 serving to prevent displacement of the belt during operation of the pulley. A pinion 13 is secured to the hub 8 in any desired manner.

Projecting from the flange 10 at the inner side thereof, that is to say that side which is opposite the hub 8, is an annular flange 14 extending axially of the shaft, said flange being provided with a plurality of radial openings such as 15 therethrough. These openings are preferably of angular outline, being conveniently formed by broaching a circular drill hole with a square broach, one side 16 of each opening lying substantially in the plane of the inner radial surface 17 of the flange 10 as indicated by way of example in Fig. 5. The openings 15 are spaced equally about the periphery of the member 14, and in such openings are loosely fitted stems 18 constituting portions of radially movable pulley segments which also comprise the arcuate rim members 19. These stems bear against the surface 17 of the flange 10 and are guided thereby.

Each of the stems is provided with an opening such as 20, such openings serving for the reception of the opposite ends 21, 22 respectively of springs 23 of hairpin type interposed in the alternate spaces between stems 18. The springs 23, at their central portions, are coiled about fixed pins 24 projecting inwardly from the flange 10. As thus arranged the opposite ends 21, 22 of the springs bear against the stems of adjacent segments and tend to move such segments radially inward toward the shaft, thus contracting the pulley.

An expanding device 25 is mounted to slide upon the shaft 3, such device comprising an active cam portion 26 of substantially frusto-conical form and an inactive or dwell portion 27 of substantially cylindrical form coaxial with such conical portion and projecting from the smaller end of the latter. The cylindrical portion 27 is provided with a series of radially outstanding, axially extending ribs 28 corresponding in number to the segments of the pulley, such ribs being continued, as indicated at 29, longitudinally of the peripheral surface of the conical member 26. The inner end of each stem 18 is provided with an axial slot interengaging with a rib 28 or the continuation 29 thereof, the interengagement of such parts serving to prevent rotation of the wedge member 25 relatively to the stem members.

The outer end of the expanding device bears against a collar 30 constituting one element of an anti-friction thrust bearing which also comprises the collar 31 and the balls 32 interposed between such collars. The portion 3 of the shaft is preferably provided with a keyway 33 at its threaded part with which engages a feather 34 projecting inwardly from a collar 35 mounted upon the shaft. A nut 36 engages the threaded portion of the shaft, such nut having a flange 37 constituting a hand wheel whereby the nut may be turned. The inner end of the nut 36 engages the collar 35 and by turning such nut, said collar is caused to move longitudinally of the shaft, being prevented from rotating upon the shaft by the engagement of the feather 34 with the spline 33. When the pulley is fully contracted, the inner ends of the several stems 18 bear against the dwell portion 27 of the expanding device, the springs 23 serving to press such stems against such cylindrical dwell portion with sufficient force to prevent the accidental removal of the wedge device from between the stems. When it is desired to expand the pulley, the hand wheel 37 is turned, causing the nut 36 to force the collar 35 and the thrust bearing longitudinally of the shaft. The expanding device 25 is thus moved bodily along the shaft, bringing the conical cam portion thereof into operative engagement with the inner ends of the several stems 18, thus forcing the segments of the pulley outwardly, and increasing the effective diameter of the same. The component of force tending to move the pulley longitudinally of the shaft during its adjustment is opposed by the anti-friction bearings so that the pulley is free to turn upon the shaft regardless of the position of adjustment of its parts. Moreover, by the provision of the splined collar 35, the turning of the pulley upon the shaft has no effect upon the nut 36 such as might cause such nut to turn in one direction or the other. It is thus clear that turning of the nut 37 serves to adjust the pulley parts in the desired manner and that such adjustment is maintained without necessitating the employment of a set screw or lock nut for holding the nut 36 in adjusted position. The springs 23 serve to contract the pulley in accordance with the retraction of the nut 36, such springs forcing the expanding device outwardly until the ends of the stems come into contact with the cylindrical dwell portion thereof. Further movement of the latter device is thus prevented by the frictional engagement of the ends of the stems with such cylindrical portion and even if the nut 36 should be entirely removed, the structural integrity of the pulley is not destroyed although the pulley be continuously subjected to vibration or careless handling.

The pulley as thus constructed contains a minimum number of parts, while at the same time providing for great accuracy in adjustment, even while the pulley is running, by the manipulation of a single element. As each of the segments of the pulley is continuously under control of one of the spring members and as such springs are of sufficient strength to overcome the action of centrifugal force at any speed at which the pulley will ordinarily be run, there is no possibility that the pulley segments will be caused to vibrate or rattle during operation and the pulley as thus constructed is found to be substantially noiseless even after long continued use at high speeds.

I claim—

1. An expansion pulley comprising radially movable, circumferentially spaced segments, and a spring disposed in each alternate space between said segments, the opposite ends of said springs reacting in substantially radial directions against parts of the segments disposed at either side of the respective springs.

2. An expansion pulley comprising a plurality of radially movable segments each having a rim and a radially directed stem, and a spring of hair pin type disposed in each alternate space between said stems and having its ends engaging elements of the adjacent stems.

3. An expansion pulley comprising a pair of radially movable segments each having a guiding stem, and a hair pin spring interposed between said stems and having its central portion coiled about a relatively fixed stud, and its end portions engaging openings in the respective stems.

4. An expansible pulley comprising a radial guide flange, a plurality of segments each having a radially directed guiding stem slidably engaging the guide flange, an expander device comprising a substantially conical member and a cylindrical member coaxial therewith and extending from the smaller end thereof, said cylindrical member constituting an abutment for the inner ends of the several guiding stems when the pulley is fully contracted, and a spring disposed in each alternate space between adjacent guide stems, each spring bearing against a relatively fixed part carried by the guide flange and also against the guide stems defining the opposite sides of said space, the several springs cooperating to contract the pulley.

5. An expansible pulley comprising a radial guide flange, a plurality of radially movable segments each having a guide stem slidably engaging the guide flange, each of said stems being provided with an opening intermediate its ends, a spring of hairpin type disposed in each alternate space between adjacent guide stems, opposite ends of each spring being disposed in the openings respectively of the guide stems defining the space in which the spring is located, an axially movable expander member comprising a part of frusto-conical form and a substantially cylindrical member coaxial therewith and projecting from the smaller end thereof, said latter part constituting an abutment to limit inward movement of the segments when the pulley is fully contracted by the several springs, and means for moving said member to expand the pulley.

6. An expansible pulley having a plurality of independent rim members each having a radially directed guide stem, a centrally disposed and axially movable expander device comprising a cam element of frusto-conical form and a substantially cylindrical dwell element extending axially from the smaller end of said first element, axially extending ribs projecting from the peripheral surface of said cylindrical element, continuations of said ribs also projecting from said conical element, the several ribs engaging slots in the ends of the respective guide stems, and means for moving said expander device.

7. An expansion pulley comprising a hub, a flange projecting radially therefrom, said flange having an integral, axially projecting annular member provided with a plurality of angular, radial openings, one side of each opening lying substantially in the plane of the radial inner surface of the flange, a plurality of rim members each having a guiding stem fitting one of said openings and slidably engaging said inner surface of the flange, wedge means for forcing said stems outwardly, and resilient means independent of the wedge means normally tending to move said guide stems inwardly.

8. An expansible pulley device comprising a shouldered shaft having screw threads at one end, an anti-friction thrust collar bearing against the shoulder of the shaft, a hub turning freely on the shaft and having one end in engagement with said collar, a radial flange outstanding from the hub, radially movable rim members supported by the flange, springs normally tending to move said rim members radially inward, an expander device slidable axially of the shaft for moving the several rim members outwardly, an antifriction collar bearing against the outer end of said expander device, and a manually operable nut engaging the screw threaded portion of the shaft and constructed and arranged to force the last named antifriction collar and the expander device axially of the shaft.

Signed by me at Boston, Mass., this 19th day of July 1922.

JOSEPH B. HOWE.